INVENTOR
GENUNG L. CLAPPER
BY Paul M Bravner
AGENT 3,303,473
Patented Feb. 7, 1967

3,303,473

ADAPTIVE LOGIC CIRCUITS

Genung L. Clapper, Vestal, N.Y., assignor to International Business Machines Corporation, New York, N.Y., a corporation of New York Filed Oct. 28, 1963, Ser. No. 319,317
11 Claims. (Cl. 340—172.5)

Figure 1A:
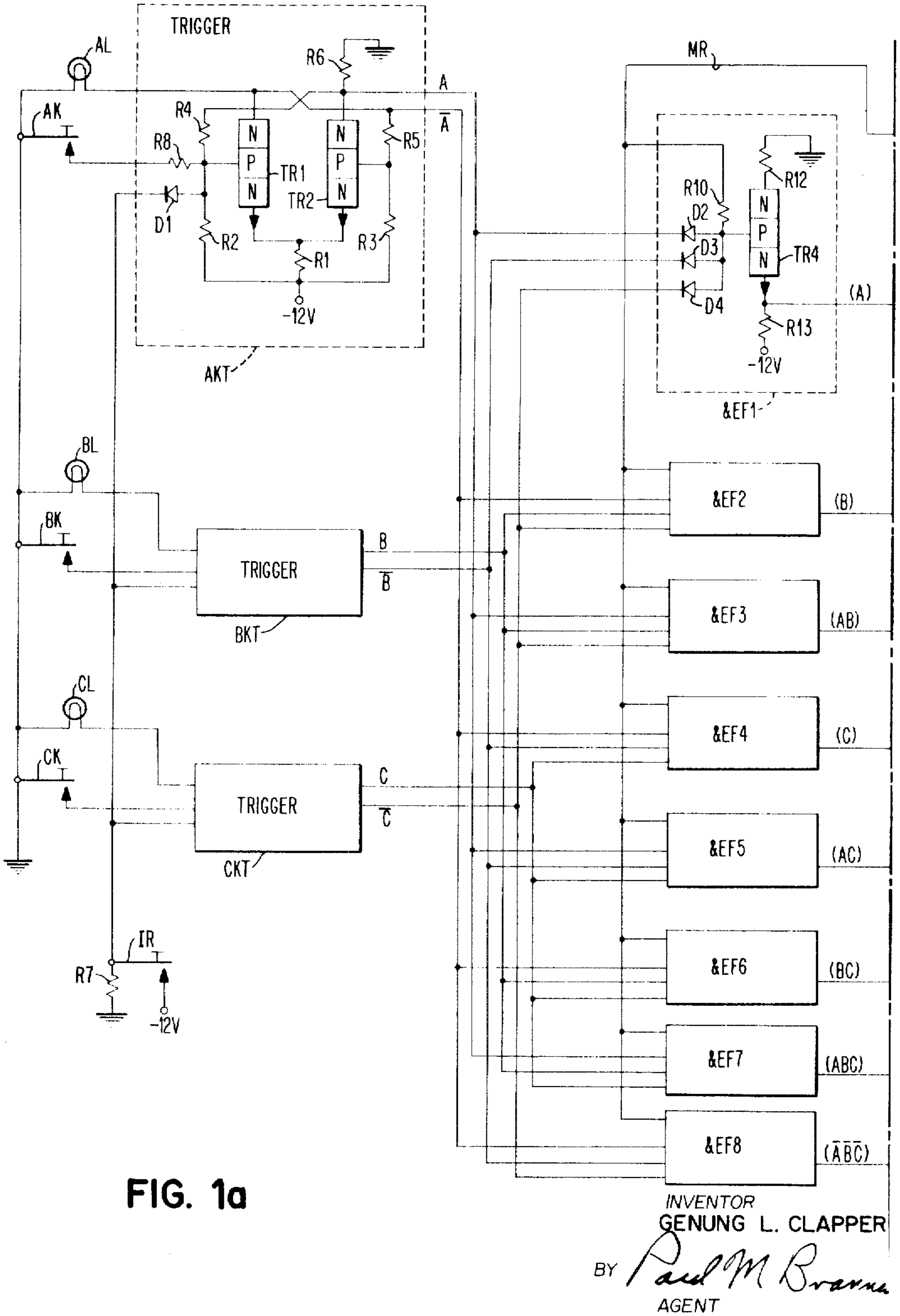

This invention relates to logic circuits, and particularly to logic circuits which may be trained or adapted to changing input-output requirements.

Conventional logic circuits are arranged in accordance with well-known design formulas and specifications so that, for a given set of input conditions, a given set of output conditions will result. However, the input-output relations are fixed by the circuit design and configuration and can only produce the input-output relations for which they were originally designed.

Adaptive logic circuits are constructed and arranged so that a "learning" process is provided in which various input combinations are successively set up and desired output conditions are obtained therefrom. After this learning or conditioning phase, the adaptive logic will continue to provide outputs in accordance with the selected input conditions for which the circuits have become adapted. Thereafter, when desired, the adaptive logic circuits can be retrained to provide a new set of responses to new sets of selected input conditions.

Adaptive logic circuits as previously proposed have utilized devices which vary in their response in accordance with variations in environmental conditions. That is, these devices are affected by ambient temperature, variation in power supply voltages, etc. Also, some of these devices are volatile in nature, and power supply interruptions can cause them to lose or change information stored therein.

Accordingly, it is a principal object of this invention to provide an improved adaptive logic circuit which is environmentally stable.

Another object of the invention is to provide an adaptive logic circuit which is non-volatile, retaining stored information in the absence of power.

A further object of the invention is to provide an adaptive logic circuit utilizing a novel combination of transistors and a magnetic core.

Still another object of the invention is to provide an improved adaptive logic circuit in which the stored information is transferred between a transistor latch circuit and a magnetic core, in such manner that a power failure will not result in either a loss of stored information or a change in the value of the stored information.

A further object of the invention is to provide an improved adaptive logic circuit in which a transistor latch circuit and a magnetic core are combined to provide a non-volatile memory.

Still another object of the invention is to provide an improved adaptive logic circuit in which an incandescent lamp is incorporated in the circuit to function both as an indicating device and as an operating circuit element.

Briefly described, an adaptive logic circuit in accordance with the present invention comprises a magnetic core having a plurality of windings, a 2-transistor latch circuit and an incandescent indicator lamp. A common input-output circuit connection is provided, and also a conditioning input circuit connection. The parts are arranged so that, when the input and conditioning circuits are each energized, the latch circuit is turned "on" and the magnetic core is also "set" to a first stable condition. With the circuit in this condition, input signals are transmitted to the output. If the power supply fails or is turned off, the "enabled" condition is retained by the magnetic core being in its set or first condition. When power is restored, the core is reset, or placed in a second stable condition. The flux change, which characterizes the conditioning of the core, turns the transistor latch circuit on so that the circuit is restored to the condition it was in when the power was removed.

This circuit also employs a conventional incandescent lamp which, in addition to indicating the state of the logic circuit with which it is associated, also functions as an integrating device due to the change in resistance of the filament as the temperature increases with time and current.

The foregoing and other objects, features and advantages of the invention will be apparent from the following more particular description of a preferred embodiment of the invention, as illustrated in the accompanying drawings.

Figure 1B:
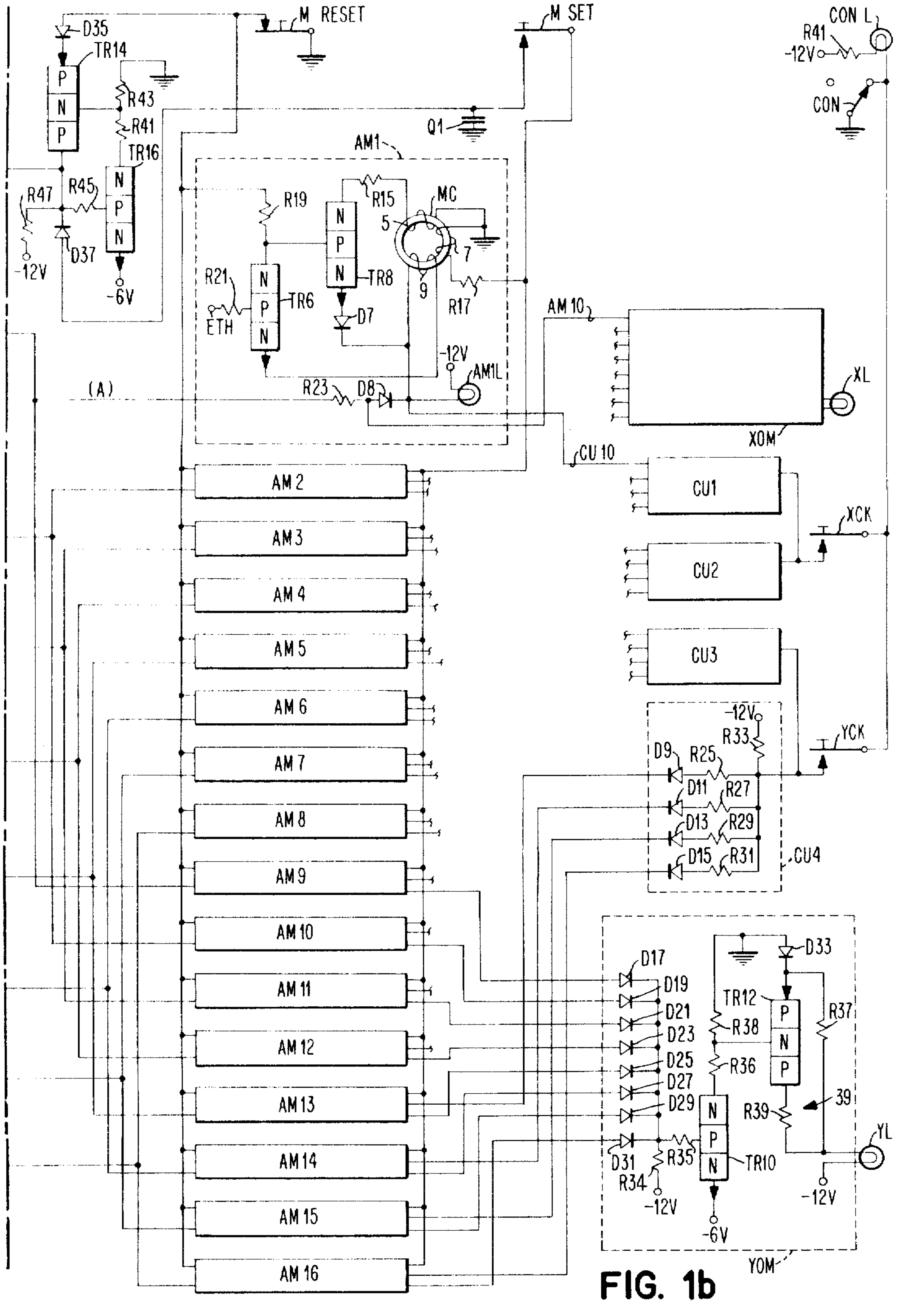

In the drawings:

FIGS. 1*a* and 1*b*, placed side by side, are diagrammatic views of an adaptive logic system employing a preferred embodiment of the invention.

Referring to the drawings, a preferred embodiment of the invention is shown therein in diagrammatic form. The system comprising the invention includes a number of units which are similar in construction and are interrelated in a manner to be subsequently described. For each of the units which are similar in construction, only the detailed features of one of the units is shown and described, so that it will be obvious from the detailed description of one of the unitary elements how the remainder of the like elements are to be constructed.

The arrangement includes a plurality of input triggers, such as the triggers designated AKT, BKT and CKT, only the detailed structure of trigger AKT being shown. Associated with each of the input triggers is an input key such as the keys AK, BK and CK, and an indication lamp such as the lamps AL, BL and CL. For the purpose of resetting the triggers, an input reset key IR is provided, which when operated will set the triggers to their normal or off condition. The detailed structure of each of the triggers is similar to that shown within the dotted rectangle for trigger AKT. As shown, the trigger is of relatively conventional construction, comprising a pair of emitter coupled transistors, TR1 and TR2, which are of the NPN junction type. The bases of transistors TR1 and TR2 are connected to terminal −12 v. via resistors R2 and R3, respectively. The bases of the two transistors are cross-coupled to the collectors of the other transistor of the pair via resistors R4 and R5. For transistor TR2, a load resistor R6 is connected between the collector of transistor TR2 and ground, while the load for transistor TR1 consists of the indicator lamp AL connected between the collector of transistor TR1 and ground. The base of transistor TR1 is normally connected to ground via a reversely biased diode D1 and resistor R7, but when input rest key IR is depressed, a −12 volt potential is supplied via diode D1 to the base of the transistor TR1, to set the transistor in its off condition, so that the trigger is set off. When it is desired to store one of the three possible inputs, input key AK is depressed which connects the base of transistor TR1 to ground via resistor R8, which causes the trigger to reverse its conductive state, whereupon the lamp AL is lighted to indicate that trigger AKT has been set on, and an output is supplied over the output line designated A. The output line $\bar{A}$ does not have an output signal thereon at this time.

With the implementation of the circuitry as shown in the drawings, the presence of a signal on a particular line, such as line A, is indicated by this line standing at a value of approximately −2 volts, while the line on which no output signal is present; e.g., $\bar{A}$, has a voltage of approximately −10 volts. With line $\bar{A}$ at −10 volts, it is apparent that a 10-volt potential exists across the indication lamp AL; and this lamp would be lighted to indicate that the key trigger AKT controlled by the first key AK has been set on.

Each of the other two input triggers BKT and CKT operate in similar fashion. Since each of the triggers is independent in its operation from the other two, it can be seen that the three triggers can be set on or off in all of the various combinations. Also, it is apparent from the drawings that each of the triggers is provided with an output line and its complement; that is, A, $\bar{A}$, B, $\bar{B}$, C and $\bar{C}$. Thus, all the possible values of the three input triggers are indicated by the outputs in the six output lines therefrom. The outputs from the input triggers are supplied in each of the various possible combinations out of the eight which are possible to circuits herein referred to as "AND emitter-followers" designated by the reference characters &EF1 through &EF8. The structure of all of these circuits being similar, it is deemed sufficient to describe only one in detail, that one being &EF1. As can be seen, the inputs are supplied through three diodes, such as diodes D2, D3 and D4 connected to form an AND circuit including a resistor R10 and which circuit is returned to the collector of a transistor TR14, via a line designated as MR. The output of the AND circuit is connected to the base of the transistor TR4, which has its collector connected to ground through a resistor R12 and its emitter connected to −12 volts through a resistor R13, the output therefrom being taken from the emitter in the usual fashion of an emitter-follower circuit.

Each of the circuits &EF1 through &EF8 is connected to the appropriate ones of the output lines from the three input triggers, in such manner that the outputs of these circuits represent the eight possible combinations which can exist for the input triggers. As one illustration, &EF1 has its inputs connected to the A, $\bar{B}$ and $\bar{C}$ output lines of the triggers AKT, BKT and CKT. The output from &EF1 accordingly represents the condition A and $\bar{B}$ and $\bar{C}$. The connections for each of the other seven circuits may be determined by noting the various connections of the input lines to the output lines of the triggers. The following table indicates the relations of these circuits to their outputs:

| | |
|---|---|
| &EF2 | $B\overline{AC}$ |
| &EF3 | $AB\bar{C}$ |
| &EF4 | $C\overline{AB}$ |
| &EF5 | $AC\bar{B}$ |
| &EF6 | $BC\bar{A}$ |
| &EF7 | ABC |
| &EF8 | $\overline{ABC}$ |

From the foregoing, it should be apparent that at all times there will be a signal on one of the output lines of the circuits &EF1 through &EF8, which signal represents the state of the input triggers AKT, BKT and CKT.

The outputs from &EF1 through &EF8 are the outputs of the triggers AKT, BKT and CKT in all of their combinations. Since there are three triggers, each having two states, there are $2^3$ or eight combinations. These combinations are shown by the letters in parentheses on the output lines from &EF1 through &EF8 as given in the following table:

| | |
|---|---|
| &EF1 | (A) |
| &EF2 | (B) |
| &EF3 | (AB) |
| &EF4 | (C) |
| &EF5 | (AC) |
| &EF6 | (BC) |
| &EF7 | (ABC) |
| &EF8 | $\overline{(ABC)}$ |

The outputs from &EF1 through &EF8 are supplied to a plurality of adaptive memory units, designated by the reference characters AM1 through AM16. In the present case there are 16 memory units since there are eight possible input combinations and two output conditions to be provided for each of the eight input conditions. Accordingly, sixteen adaptive memory units are required. Each of the units is similar to that shown in detail in the dotted rectangle designated by reference character AM1 and the description of this one unit will suffice for all. The unit includes a transistor latch including two transistors TR6 and TR8, and a magnetic core designated by the reference character MC. Core MC has three windings thereon designated by the reference characters 5, 7 and 9, all wound in similar sense. The winding 5 is connected via a resistor R15 to the collector of transistor TR8, the other terminal of winding 5 being connected to ground. One terminal of winding 7 is connected to ground and the other is connected through a resistor R17 to a memory setting circuit including the key switch designated by reference characters M SET, which when closed connects the windings 7 of all of the cores in the adaptive memory units to ground via a capacitor Q1, which provides a resetting action to be subsequently described. The winding 9 of core MC has one terminal thereof connected to the emitter of transistor TR6, the other end of the winding being connected to the emitter of transistor TR8 via a diode D7, this terminal of the winding also being connected to one terminal of an indicator lamp designated by the reference character AM1L, the lamp circuit being completed to the power terminal −12 v. The collector of transistor TR6 is connected to the base of transistor TR8 and also through a resistor R19 and a normally closed resetting key designated by the reference characters M RESET to ground. The base of transistor TR6 is connected via a resistor R21 to an adjustable source of biasing potential designated by reference characters ETH. The value of this voltage is chosen to provide a suitable threshold operating voltage for the adaptive memory unit. One of the inputs to each of the memory units, as previously mentioned, is from the AND emitter followers &EF1 through &EF8, while the other input is supplied from one of a plurality of conditioning units designated by the reference characters CU1 through CU4. The input from the AND emitter followers is via a resistor R23, and a diode D8 to the circuit connected to the left-hand terminal of winding 9 of the core MC. The input from the conditioning unit is connected directly to the junction between diode D8 and the winding 9 of core MC. The output from each of the adaptive memory units is taken from the junction between the resistor R23 and the diode D8 and these outputs, of which there are 16, are supplied to the appropriate one of two output mixer units designated by the reference characters XOM and YOM, the structure of which will be subsequently described in detail. The combination of the parts in each of the adaptive memory units comprises a novel combination including a latch-type transistor circuit which is arranged to cooperate with the magnetic core in such fashion that loss of power will not cause a loss of the information or conditions stored in the latch circuit. Conditioning of the latch circuit will set the core in such manner that, should the power supply to the unit be turned off for any reason, restoration of the power and operation of the setting switches will cause the magnetic core to reset the transistor latch circuit to its previous condition.

In operation, with power on and the M RESET switch closed, the transistor TR6 has its collector connected to ground through resistor R19. The threshold voltage ETH is set to some suitable value in the power supply, not shown, such as, for example, −9 volts. Current flows through transistor TR6, through the winding 9 of the core MC and through lamp AM1L to the −12 v. terminal. The value of resistor R19 is sufficiently high that the current flow through lamp AM1L is insufficient to cause it to glow visibly. Also, the value of the current is insufficient to cause any change in the core MC.

Consider now the operation of the adaptive memory units under the condition where an input is supplied to the adaptive memory unit from an appropriate AND emitter-follower, but no conditioning input is supplied thereto. In this case, either the conditioning keys XCK and YCK are open or the conditioning switch CON is not operated. The conditioning units in the illustrative embodiment are designated by the reference characters CU1, CU2, CU3 and CU4. All of these units are identical in structure, and the detailed circuitry is shown for one. As shown in the dotted rectangle designated by the reference character CU4, the conditioning unit comprises a plurality of diodes such as D9, D11, D13 and D15, each connected to a —12 volt source via an individual resistor such as R25, R27, R29 and R31 and a common dropping resistor R33. The junction between the individual load resistors and the common resistor is connected via a key such as YCK to a conditioning switch CON, which when in its on position connects the keys YCK and XCK to ground, and also completes a circuit through a conditioning indication lamp CONL, via resistor R41 to a —12 volt source, so that an indication is provided when the system is in its conditioning state. Since there are sixteen adaptive memory units, and two output conditions to be provided, it can be seen that the conditioning units CU1 and CU2 are arranged to be conditioned by operation of the first conditioning key XCK, and connections from units CU1 and CU2 are established to the adaptive units AM1 through AM8. Conditioning units CU3 and CU4 have circuits connected to the adaptive memory units AM9 through AM16, the connections between units CU4 and adaptive memory units AM13 through AM16 being shown in detail, while the remainder of the circuits are eliminated for the sake of clarity.

Now from the preceding description of the conditioning units CU4, it can be seen that the connection from conditioning unit 1 to adaptive memory unit 1, designated by the reference character CU10 will, at this time, have a potential of —12 volts thereon.

The value of resistor R23 is so chosen with respect to the resistance of bulb AM1L so that the voltage at the emitter of transistor TR6 does not go as high as the threshold voltage ETH, and therefore transistor TR6 remains in conducting condition and transistor TR8 remains cut off. Under these circumstances, the voltage on the output line which is connected at the junction of resistor R23 and diode D8, and for adaptive memory unit AM1 is designated by the reference character AM10, has its output voltage limited to approximately —10 volts. This voltage will not operate the associated output mixing device, later to be described, which requires approximately —6 volts for its operation.

If the conditioning switch CON is now turned on so that ground is effectively supplied to the conditioning keys or switches XCK and YCK, operation of the switch XCK will, via the conditioning unit CU1, apply a potential via the line CU10 to the adaptive memory unit AM1 such that additional current will now flow through the lamp AM1L, the parts being proportioned and arranged so that there is essentially double the amount of current flowing through the bulb. At this time the voltage at the emitter of transistor TR6 will rise by virtue of the increased current flow through the lamp AM1L, increasing the voltage drop thereacross, with a concomitant increase with is transmitted by winding 9 to the emitter of transistor TR6. The emitter of transistor TR6 rises about the potential ETH, which thereby cuts off conduction in transistor TR6 so that the collector voltage of this transistor rises. As a result, the voltage at the emitter of transistor TR8 will also rise; and with the connection between the emitter of transistor TR8 via diode D7 to the emitter of transistor TR6, the emitter of TR6 will have its voltage maintained sufficiently high to maintain TR6 cut off, even if the input and the conditioning pulses are now removed.

With the adaptive memory circuit in this condition, if an input signal is now applied via the line A, it is not attenuated and full output is furnished via the output line AM10 to the output mixer unit XOM.

The output mixers XOM and YOM are identical in construction and operation and, accordingly, only one of the two, YOM, need be described in detail. Each of the output mixer units has as inputs thereto eight of the output lines from a selected eight of the adaptive memory units, the output unit XOM having inputs from adaptive memory units AM1 through AM8, while unit YOM receives the output lines from adaptive memory units AM9 through AM16. As shown in the dotted rectangle designated YOM, each of these lines is supplied to a respective input diode in a conventional diode mixing circuit, such as that including the diodes D17, D19, D21, D23, D25, D27, D29 and D31. These have a common load resistor R34 which is connected from the junction between the diodes to the negative source of potential —12 v. The output from this diode mixer circuit is supplied via resistor R35 to the base of an NPN transistor TR10, the emitter of which is connected to negative potential —6 v., while the collector is connected through load resistances R36 and R38 to ground, and also to the base of PNP transistor TR12 via R36. The emitter of transistor TR12 is connected to ground through a diode D33, while the collector is connected by resistor R39 and an indicating lamp YL to —12 v. A resistor R37 is connected in shunt from the emitter of transistor TR12 to the lamp YL. In operation, the lamp YL is normally dark since insufficient current flows therethrough to cause the lamp to be illuminated, but when any one or more of the input lines has a signal supplied thereto which raises the potential to approximately —6 v., the transistors TR10 and TR12 will supply sufficient energy through lamp YL to illuminate the lamp, thereby indicating an output on one of the eight associated adaptive memory unit output lines.

Accordingly, under the last-described conditions for the adaptive memory unit AM1, with a signal present on the output line AM10, the indicating lamp XL associated with output mixer XOM would be illuminated.

Now considering the operation of the adaptive memory units with respect to the cooperation of the transistor latch circuit and the magnetic core, it will first be assumed that the latch circuit has been placed in its on condition in a manner previously described. When the latch is turned on, TR8 is conducting and the accompanying flow of current through winding 5 of magnetic core C will cause the core to be magnetized in a direction which may be considered its "on" state.

Then if the power is removed from the circuit, the core will not change from its first magnetized state, even though the flow of current is interrupted through winding 5, because of the stable remanent characteristics of the core as is well known in magnetic core storage art. If the power is then turned back on, the M SET key is operated, at which time the charge on capacitor Q1 will be discharged through the M SET switch, through resistor R17 and winding 7 on the core MC to ground. This current pulse will reset the magnetic core MC to its "off" state, and will cause a voltage impulse to be induced in winding 9 of the core which is of a polarity which causes the emitter of transistor TR6 to rise and will cut off conduction in transistor TR6. Transistor TR8 will now conduct and cause transistor TR6 to remain cut off by holding the emitter thereof at a high level. The flow of current in winding 5 at this time will again set the core MC to its first or "on" state.

If it is now desired to destroy information in the adaptive memory unit AM1, the switch M RESET is operated at the same time as the switch M SET is operated. Under these circumstances, the core MC is reset by the energy supplied from capacitor Q1, but even though the emitter voltage of transistor TR6 rises as previously described, the collector of this transistor cannot rise because the connection to ground is interrupted at the contact of the switch M RESET. Under these circumstances, the base of transistor TR8 does not rise and therefore, transistor TR6 is not maintained in its non-conducting condition. Thus, the latch circuit does not come on even after the M RESET switch is released and the adaptive memory unit returns to its initial or "off" state.

The circuit for supplying charging energy to the resetting capacitor Q1 includes a pair of complementary transistors TR14 and TR16, the PNP transistor TR14 having its emitter connected through a diode D35 and the contact of the M RESET key to ground with the base of transistor TR14 connected to the collector load resistors R41 and R43, which are connected in series between the collector of TR16 to ground. The collector of transistor TR14 is connected to a junction point from whence resistor R45 establishes a connection to the base of transistor TR16, the diode D37 is included in a connection to the capacitor Q1, and resistor R47 is connected from the junction to a negative source of potential —12 v. To this same junction point is connected the common line MR which supplies energy to each of the load resistors in the AND emitter-followers shown in FIG. 1*a*. The pair of transistors acts as a latch which serves to put a suitable back-biasing voltage on the charging diode D37, so that the capacitor Q1 is decoupled from the charging source when the latch is on. When power is first applied, or following operation of the M RESET key, the latch circuit comprising transistors TR14 and TR16 is off; that is, both transistors are nonconducting. In this state, a charging path is provided for capacitor Q1 to the —12 v. potential via the diode D37 and the resistor R47. When the M SET key is operated, capacitor Q1 discharges through the core windings and the potential at the anode of diode D37 rises toward ground. As current flows in the diode D37, the voltage at the junction of resistors R47, R45 and the collector of transistor TR14 also rises. When the voltage at the junction reaches approximately —6 volts, the bias on the transistor TR16 is removed and the voltage at the collector of this transistor drops to approximately —6 volts. This turns on transistor TR14 raising the voltage at the junction of its collector, and the circuit is accordingly "latched up." As the voltage rises at the junction, the charging path for the capacitor Q1 is decoupled by the back-biasing of diode D37, and the back resistance of this diode is normally enough to insure that the capacitor is fully discharged so that the M SET key is ineffective. At any time thereafter, operation of the M RESET key or removal of the power source will cause the transistors TR14 and TR16 to drop out of conduction and place the latch circuit in its off condition, which permits another single shot of energy to thereafter be supplied to the core setting circuits by operation of the M SET key.

Under normal operating conditions, the M SET key having been operated, the latch circuit is in its on condition with the transistors TR14 and TR16 conducting, so that the junction point to which the line MR connected is relatively high in potential, and thus all of the input AND circuits in the AND emitter-followers &EF1 through &EF8 are enabled, so that inputs may be supplied therefrom to the adaptive memory units. Thus, the interlock circuit serves to (1) prevent more than one pulse of energy being supplied to the core setting circuits from capacitor Q1 for each operation of switch M SET and (2) disable the inputs so that no new input conditions can be registered unless and until the proper sequence of operations of the M SET and M RESET keys is employed. This insures that any time that the M RESET is operated to restore the transistor latch circuit portions of the adaptive memories, the M SET key must thereafter be operated in order to transfer any information stored in the magnetic cores of the adaptive memories to the latch circuits, so that all information in the cores is placed in the latches when the adaptive memories are in their normally operative state. Until the M SET key is operated to turn on the interlock latch, new inputs are rendered ineffective by disabling the input circuitry.

The operation of the system as a whole will now be described, since each of the component circuit arrangements has been explained in detail hereinbefore. To first utilize this system, the various sources of potential will be energized by energizing the power supply which supplies the apparatus, the details of this supply not being shown or described since it forms no part of the invention. With power supplied to the circuits, the M SET key is now operated so that any stored information which is in the magnetic cores of the adaptive memory units will be supplied to the transistor latches, and the transistor latches will be set on and such condition will be indicated by illumination of the associated indicator light, such as the lamp AM1L associated with adaptive memory unit AM1.

If it is desired that new information be entered, the M RESET key should then be operated and maintained in an operated or open state while simultaneously closing the M SET key which will cause the stored information to be erased as was previously described in the detailed description of the operation of the adaptive memory units. The erasure of the stored information can be checked by releasing the M RESET key and thereafter pressing the M SET key. At this time, each of the indicator lamps associated with the adaptive memory units should remain off, indicating that all the adaptive memory units have been cleared of information and are ready for conditioning.

For the conditioning operation, the conditioning switch CON is placed in its on position as shown in the drawings, at which time the condition indicating lamp CONL will be lighted and the ground connection will be established to the two output condition keys XCK and YCK. These conditioning keys should not be operated until the input register has been cleared by operation of the input register reset key IR, FIGURE 1*a*. The desired input and output relations having been set up in a truth table indicating the binary values of the inputs *a*, *b* and *c*, and the desired outputs *x* and *y*, these values may be entered into the adaptive memory units one by one. In doing this, the input keys AK, BK and CK are operated as required to indicate the particular input conditions, and thereafter the output condition keys XCK and YCK are operated to indicate the desired output conditions. After each set of values is entered the input register is reset by operation of the register reset key IR and the next set of values is entered into the inputs followed by conditioning by operation of the output condition keys. Since the adaptive memory units set up in connection with the various input and output conditions each have an individual indicator lamp associated therewith, these conditions can be checked by noting the indication lamps which are on, indicating that a particular adaptive memory unit is active.

After all of the truth table values have been entered into the system, the conditioning switch is turned off, so that further conditioning cannot take place. At this time, all of the adaptive memory units which have been properly conditioned during the conditioning process will be on and, as previously explained, will afford a low impedance path between the input thereto and the output to the output mixer unit associated with the particular adaptive memory unit. Thereafter, for particular input conditions as determined by operations of the keys AK, BK and CK, particular ones of the adaptive memory units will supply outputs to the output mixer units XOM or YOM, or both, to thereby light either the lamp XL or the lamy YL, or both of these lamps.

To set up a new combination of conditions in the adaptive memory units, the preceding operations may be repeated, starting with destruction of the information stored in the adaptive memory units by operation of the M SET and M RESET keys.

As was previously pointed out, with a particular combination of adaptive memory units activated as described above, if the power is turned off and then turned on again, the information which in the interim is stored in the magnetic cores associated with each of the adaptive memory units will be returned to the transistor latch circuit portion of the adaptive memory unit, so that the adaptive memory units will be again set to the required combinations. Thus, it will be apparent that, once having conditioned the adaptive memory units for a particular set of input and output conditions, only deliberate action can destroy the particular logical combination obtained thereby, since the system is not affected by temporary or sustained loss of power, either accidentally or deliberately.

From the foregoing, it will be apparent that the present invention provides a novel and improved form of adaptive memory unit, which may be combined with input and output units to provide an adaptive logic system which is stable in its operation and is non-volatile in that loss of power accidentally or otherwise does not cause the adaptive logic system to change the logic combination for which it has been set.

While the invention has been particularly shown and described with reference to a preferred embodiment thereof, it will be understood by those skilled in the art that various changes in form and details may be made therein without departing from the spirit and scope of the invention.

What is claimed is:

1. An adaptive logic system comprising, in combination, a plurality of input circuits, each capable of supplying input signals therefrom;

a plurality of output circuits, each requiring the supply thereto of output signals to render said output circuits effective;

a plurality of conditioning circuits, each capable of supplying conditioning signals therefrom; and a plurality of adaptive memory units, each of said adaptive memory units having an input connected to an associated one of said input circuits, an output connected to an associated one of said output circuits, and a conditioning input connected to one of said conditioning circuits, and arranged to provide an output to said output circuit when and only when an input is provided to said input circuit, following the supply to said unit of an input from said input circiut and a conditioning signal from said conditioning circuit.

2. An adaptive logic system comprising, in combination, a plurality of adaptive logic units, each unit being capable of assuming a first or a second stable state, said first state being a reference state, each of said units being established in said second state only upon the supply thereto of an input signal and a conditioning signal, each of said units supplying an output signal upon supply thereto of an input signal when and only when said unit is in said second state;

a plurality of input signal lines;

transformation means for transforming each possible combination of said inputs into a transformed input signal, each of said transformed input signals being supplied to an associated adaptive logic unit;

at least one conditioning signal source;

means for supplying conditioning signals from said source to said adaptive logic units; and output signal means connected to said adaptive logic units and governed by the output signals from said adaptive logic units.

3. An adaptive logic system comprising, in combination, a plurality of adaptive logic units, each unit being capable of assuming a first or a second stable state, each of said units being established in said second state only upon the supply thereto of an input signal and a conditioning signal, each of said units supplying an output signal upon supply thereto of an input signal when and only when said unit is in said second state;

a plurality of input signal lines;

transformation means for transforming each parallel combination of said inputs into a transformed input signal, each of said transformed input signals being supplied to an associated adaptive logic unit;

a plurality of conditioning signal lines, one for each group of adaptive logic units defined by said transformed input signals, said conditioning signal lines being connected to each of the adaptive logic units in the associated group; and output signal means, one for each group of adaptive logic units, connected to said adaptive logic units to indicate the state of the associated group of adaptive logic units.

4. An adaptive logic system comprising, in combination, a plurality of input lines, $n$ in number;

a plurality of output lines, $m$ in number;

transformation means connected to said input lines and providing a plurality of $2^n$ transformed input lines representing each possible combination of input lines;

a plurality of conditioning signal lines, $m$ in number; and a plurality $m(2^n)$ of adaptive logic units, each unit being capable of assuming a first or a second stable state, said first state being a reference state, each of said units being established in said second state only upon the supply thereto of an input signal from an associated one of said transformed input lines and an associated one of said conditioning signal lines, each of said units providing an output signal to an associated one of said output lines upon supply thereto of an input signal on said associated transformed input line when and only when said unit is in said second state.

5. An adaptive logic system as claimed in claim 4 in which the signals are binary valued.

6. An adaptive logic system comprising, in combination, a plurality of input lines, $n$ in number;

a plurality of input registers, $n$ in number, one for each of said input lines;

a reset line common to all of said registers;

a first and a second register output line for each of said registers;

said registers being effective when reset by a signal supplied from said reset line to provide a first output on said first register output line, said registers being settable by signals supplied thereto on said input lines to provide a second output on said register output line;

transformation means connected to said register output lines for providing a plurality of transformed output signals equal in number to $2^n$;

a plurality of conditioning signal lines, $m$ in number;

a plurality of logic output lines, $n$ in number; and a plurality of adaptive logic units, equal in number to $m(2^n)$, each unit being capable of assuming a first or a second stable state, said first state being a reference state, each of said units being established in said second state only upon the supply thereto of an input signal from an associated one of said transformed input lines and an associated one of said conditioning signal lines, each of said units providing an output signal to an associated one of said output lines upon supply thereto of an input signal on said associated transformed input line when and only when said unit is in said second state.

7. An adaptive logic unit comprising, in combination,
a magnetic core having a plurality of windings thereon and having a first and a second remanent flux state;
a transistor latch circuit comprising a first and a second transistor, with the collector of said first transistor coupled to the base of the second transistor;
circuit means including a first winding of said core for coupling the emitters of said first and second transistors;
means for supplying a threshold voltage to the base of said first transistor;
means for supplying operating voltages to the emitter and collector of said first transistor so that said first transistor is normally conducting;
means including a second winding on said core for supplying an operating voltage to the collector of said second transistor;
means for supplying an input signal to the emitter of said first transistor effective to render the first transistor non-conducting and said second transistor conducting, the current flow through the winding of said core connected to the collector of said second transistor being effective to set said core in its second state;
an output circuit for said logic unit; and
means responsive to conduction of said second transistor to condition said output circuit to provide an output therefrom in response to an input signal supply to said emitter of said first transistor.

8. An adaptive logic unit comprising, in combination,
a magnetic core having two stable remanent flux states;
a first, a second and a third winding on said core;
a first and a second transistor;
said first transistor having its collector and base connected to sources of operating potential and having its collector connected to the base of said second transistor;
said second transistor having its collector connected in series with said first winding to a source of operating potential;
input and output circuit means connected to the emitter of said second transistor in series with said second winding to the emitter of said first transistor;
means for supplying energy to said third winding to establish said core in a first one of said two stable remanent flux states;
the parts being proportioned and arranged so that the supply of a suitable signal to said input and output circuit means establishes said transistors in a selected conductive state and causes said core to be set to the second one of said two stable remanent flux states; and
the sense of said windings being selected so that the resetting of said core to said first state induces energy in said second winding effective to cause said transistors to acquire said selected conductive state.

9. An adaptive logic unit as claimed in claim 8 in which said input and output circuit means includes a non-linear impedance connected between said circuit means and a source of operating potential to form a combined current summation and integrating means.

10. An adaptive logic unit as claimed in claim 9 in which said non-linear impedance is an incandescent lamp which is supplied with sufficient current to glow visibly only when said transistors are in said selected conductive condition.

11. An adaptive logic unit comprising, in combination,
a magnetic core having a first and a second stable remanent flux state;
a first, a second and a third winding on said core;
a semiconductor latch circuit having a first and a second stable conductive state;
means for supplying input signals to said latch circuit effective to cause its transference from said first conductive state to said second conductive state;
circuit means connecting said first winding to said latch circuit and effective to set said core in its second state when said latch circuit is in said second conductive state;
circuit means connecting said second winding to said latch circuit and effective to turn said latch circuit on when said core is returned from its second state to its first state; and
reset circuit means connected to said third winding and effective to transfer said core from said second to said first state.

References Cited by the Examiner

UNITED STATES PATENTS

| | | | |
|---|---|---|---|
| 3,106,699 | 10/1963 | Kamentsky | 340—172.5 |
| 3,201,593 | 8/1965 | Anderson et al. | 307—88 |

ROBERT C. BAILEY, *Primary Examiner.*

G. D. SHAW, *Assistant Examiner.*